(12) United States Patent
Yamada et al.

(10) Patent No.: US 9,694,784 B2
(45) Date of Patent: Jul. 4, 2017

(54) WEBBING TAKE-UP DEVICE

(71) Applicants: Kazuhiro Yamada, Aichi-ken (JP);
Akira Sumiyashiki, Aichi-ken (JP)

(72) Inventors: Kazuhiro Yamada, Aichi-ken (JP);
Akira Sumiyashiki, Aichi-ken (JP)

(73) Assignee: KABUSHIKI KAISHA TOKAI-RIKA-DENKI-SEISAKUSHO, Aichi-Ken (JP)

( * ) Notice: Subject to any disclaimer, the term of this patent is extended or adjusted under 35 U.S.C. 154(b) by 69 days.

(21) Appl. No.: 14/158,136

(22) Filed: Jan. 17, 2014

(65) Prior Publication Data
US 2014/0203132 A1    Jul. 24, 2014

(30) Foreign Application Priority Data

Jan. 22, 2013   (JP) ................................. 2013-009588

(51) Int. Cl.
B60R 22/36     (2006.01)
B60R 22/34     (2006.01)

(52) U.S. Cl.
CPC .......... *B60R 22/3416* (2013.01); *B60R 22/36* (2013.01)

(58) Field of Classification Search
CPC ...... B60R 22/34; B60R 22/36; B60R 22/3416
USPC ................. 242/382.1, 382.2, 382.4
See application file for complete search history.

(56) References Cited

U.S. PATENT DOCUMENTS

| | | | | |
|---|---|---|---|---|
| 5,495,993 A * | 3/1996 | Hibata | ........................ | 242/382.2 |
| 5,692,697 A * | 12/1997 | Eaton et al. | ................ | 242/382.2 |
| 5,820,059 A * | 10/1998 | Hibata et al. | ............... | 242/382.4 |
| 6,631,865 B2 * | 10/2003 | Palliser | ........................ | 242/382.2 |
| 6,641,076 B2 * | 11/2003 | Mori et al. | .................. | 242/382.2 |
| 6,641,078 B2 * | 11/2003 | Palliser | ........................ | 242/382.2 |
| 7,377,463 B2 * | 5/2008 | Morgan et al. | ............... | 242/382 |
| 7,384,014 B2 * | 6/2008 | Ver Hoven et al. | ........ | 242/382.2 |
| 8,579,223 B2 * | 11/2013 | Aranda | ........................ | 242/382.2 |
| 8,818,640 B2 * | 8/2014 | Odate | ............................. | 701/45 |

(Continued)

FOREIGN PATENT DOCUMENTS

JP    H0789412    4/1995
JP    2004090672    3/2004

OTHER PUBLICATIONS

JP office action and English translation of the Notice of Reasons for Rejection dated Dec. 2, 2014.

*Primary Examiner* — Sang Kim
(74) *Attorney, Agent, or Firm* — Roberts Mlotkowski Safran Cole & Calderon P.C.

(57) ABSTRACT

In a webbing take-up device, an open portion is formed in the other side, in a direction about a rotational axis of a switch pawl, of a sensor holder. In a state where an engagement piece is positioned on the outside of the open portion, the switch pawl is rotated about a shaft to cause the engagement piece to enter in a window portion, so, a distal end of the engagement piece, bent in a hook shape, faces to a regulation wall in an axial direction of the shaft. It is not necessary to elastically deform the engagement piece when bringing the regulation wall and the engagement piece into facing. Therefore, the engagement allowance in the engagement piece with the regulation wall can be enlarged and the distal end of the engagement piece can be prevented from crossing over the regulation wall and moving toward the shaft side.

5 Claims, 8 Drawing Sheets

(56) References Cited

U.S. PATENT DOCUMENTS

2013/0099043 A1* 4/2013 Benner ............... 242/382.1
2013/0256442 A1* 10/2013 Yanagawa et al. ........ 242/382.2

* cited by examiner

WEBBING TAKE-UP DEVICE

CROSS-REFERENCE TO RELATED APPLICATION

This application claims priority under 35 USC 119 from Japanese Patent Application No. 2013-009588, filed Jan. 22, 2013, the disclosure of which is incorporated by reference herein.

BACKGROUND

Field of the Invention

The present invention relates to a webbing take-up device that configures a seat belt device in a vehicle.

Related Art

In the webbing take-up device disclosed in Japanese Patent Application Laid-Open (JP-A) No. H07-89412 (the webbing take-up device is called a seat belt retractor in JP-A No. H07-89412), when a predetermined amount of webbing is pulled out, a lever rotates interlockingly with this and regulates the rotation of a control plate. If one tries to further pull out the webbing in this state, relative rotation occurs between a spool (which is called a bobbin in JP-A No. H07-89412) and further a take-up shaft, and the control plate, and interlockingly with this relative rotation, a lock arm engages with a latch plate of the take-up shaft. Due to this, the rotation of the take-up shaft and further the spool in a pull-out direction is regulated and the pulling-out of the webbing from the spool is regulated.

When the spool rotates in a take-up direction in this state and a predetermined amount of the webbing is taken up onto the spool, the lever rotates interlockingly with this so that the regulation of the rotation of the control plate by the lever is released. Due to this, the take-up shaft, and further the spool, can rotate in the pull-out direction and the webbing can be pulled out from the spool.

Incidentally, in the configuration disclosed in JP-A No. H07-89412, the lever is rotatably supported on a pivot support shaft formed on a sensor cover and is retained so as to be prevented from being taken off by a bush attached to the pivot support shaft on a pivot support shaft distal end side further than the lever. With a configuration that uses a bush to retain so as to be prevented from being taken off the lever in this way, the number of parts and the number of processes required for attachment increase. For this reason, there is a configuration where a window portion is formed in a support body like the cover, an elastic claw piece is formed on a switch member like the lever, and when attaching the switch member from the distal end of the pivot support shaft, the elastic claw piece is made elastically deformed at the edge of the window portion, for example, to bring a claw portion on the distal end of the elastic claw piece and the support body to face one another at the opposite side to the side where the pivot support shaft is formed on the support body.

In this configuration, the elastic claw piece is formed as a part of the switch member, so there is no increase in the number of parts or number of processes required for attachment. However, if the engagement allowance between the claw portion of the elastic claw piece and the support body is enlarged, it becomes difficult for the claw portion to pass through the window portion so attachability is poor.

SUMMARY

In consideration of the above-described circumstances, the present invention obtains a webbing take-up device that can enlarge an area in which a support body and an engagement portion face one another without impairing the attachability of a switch member to the support body.

A webbing take-up device pertaining to a first aspect of the invention includes: a spool that takes up a webbing by rotating in a take-up direction; a lock mechanism that regulates rotation of the spool in a pull-out direction, which is opposite to the take-up direction, by switching from an actuatable state to an actuated state; a switch member that is rotatably supported on a support body at one side of the support body, that rotates toward one side in a direction about a rotational axis, by a certain amount or more of the webbing being pulled out from the spool, so as to switch the lock mechanism from the actuatable state to the actuated state, and that rotates toward another side in the direction about the rotational axis, by a certain amount or more of the webbing being taken up onto the spool, so as to switch the lock mechanism from the actuated state to the actuatable state; a window portion that is formed in the support body and at which a regulation wall is formed, an opening being communicated with the window portion at the another side, in the direction about the rotational axis, of the window portion; and an engagement portion that is formed at the switch member, the engagement portion being entered inside the window portion by rotating with respect to the window portion from the opening toward the one side in the direction about the rotational axis so that a distal end side of the engagement portion faces, from another side of the support body, the regulation wall, such that the distal end side of the engagement portion comes into contact with the regulation wall when the switch member is displaced in a direction away from the support body in a direction of the rotational axis of the switch member.

The switch member switches the lock mechanism to the actuated state in a pulled-out state with a certain amount or more of the webbing being taken up onto the spool.

In the webbing take-up device pertaining to the first aspect of the invention, when a certain amount of the webbing is pulled out from the spool, the switch member supported on the one side of the support body rotates toward the one side in the direction about the rotational axis. Due to this, the lock mechanism switches from the actuatable state to the actuated state and the rotation of the spool in the pull-out direction is regulated. When the spool rotates in the take-up direction from this state and a certain amount (which may be the same as or different from the aforementioned certain amount) of the webbing is taken up onto the spool, the switch member rotates toward the other side in the direction about the rotational axis. Due to this, the lock mechanism switches from the actuated state to the actuatable state and the spool can rotate in the pull-out direction so that the webbing can be pulled out from the spool.

Here, the engagement portion is formed on the switch member. The engagement portion passes through the window portion formed in the support body, and the distal end side of the engagement portion faces to, in the direction of the rotational axis of the switch member, the regulation wall formed in the window portion from the other side of the support body. For this reason, when the switch member is displaced in the direction away from the support body in the direction of the rotational axis, the distal end side of the engagement portion comes into contact with the regulation wall. Due to this, the displacement of the switch member in the direction away from the support body in the direction of the rotational axis can be regulated.

Incidentally, in the webbing take-up device pertaining to the first aspect of the invention, the window portion opens on the another side in the direction about the rotational axis of the switch member. When setting the switch member, the switch member is supported on the support body in a state in which the engagement portion has been positioned on the another side in the direction about the rotational axis further than the opening. When the switch member is rotated toward the one side in the direction about the rotational axis in this state, the engagement portion passes through the window portion and the distal end side of the engagement portion faces to the regulation wall in the direction of the rotational axis of the switch member.

In this way, in the webbing take-up device pertaining to the first aspect of the invention, it is not necessary to elastically deform the engagement portion such as like an elastic claw piece when bringing the distal end side of the engagement portion into facing to the regulation wall at the another side of the support body. For this reason, the area in which the distal end side of the engagement portion and the regulation wall face to one another can be enlarged.

In a webbing take-up device pertaining to a second aspect of the invention, in the first aspect, the webbing take-up device further include an urging member that urges the switch member toward the one side in the direction about the rotational axis, wherein the distal end side of the engagement portion is set such that the distal end side of the engagement portion faces to the regulation wall in the direction of the rotational axis, in both the actuatable state and the actuated state of the lock mechanism.

In the webbing take-up device pertaining to the second aspect of the invention, the distal end side of the engagement portion is set in such a way as to face to the regulation wall in the direction of the rotational axis of the switch member in both the actuatable state and the actuated state of the lock mechanism. Moreover, the webbing take-up device further includes the urging member, and the switch member is urged by the urging member toward the one side in the direction about the rotational axis. Due to that the urging member urges the switch member in this way, the switch member does not rotate toward the another side in the direction about the rotational axis from the actuatable state of the lock mechanism, that is, the switch member does not rotate toward the side of the opening in the support body through whose window portion the engagement portion has passed.

In a webbing take-up device pertaining to a third aspect of the invention, in the first aspect or the second aspect, the webbing take-up device further include a contact portion that is provided at the support body so as to be able to contact the switch member on the another side in the direction about the rotational axis, and that regulates rotation of the switch member toward the another side in the direction about the rotational axis by the switch member coming into contact with the contact portion.

In the webbing take-up device pertaining to the third aspect of the invention, the contact portion is provided on the support body. The contact portion is able to contact the switch member on the another side in the direction about the rotational axis of the switch member, and when the switch member that has rotated toward the another side in the direction about the rotational axis comes into contact with the contact portion, further rotation of the switch member toward the another side in the direction about the rotational axis is regulated. Due to this, the engagement portion can be prevented from moving away from the window portion and the regulation wall.

As described above, the webbing take-up device pertaining to the present invention can enlarge the area in which a support body and an engagement portion face to one another without impairing the attachability of a switch member to the support body.

BRIEF DESCRIPTION OF THE DRAWINGS

An embodiment of the invention will be described in detail with reference to the following figures, wherein.

DETAILED DESCRIPTION

<Configuration of Embodiment>

Figure 1:
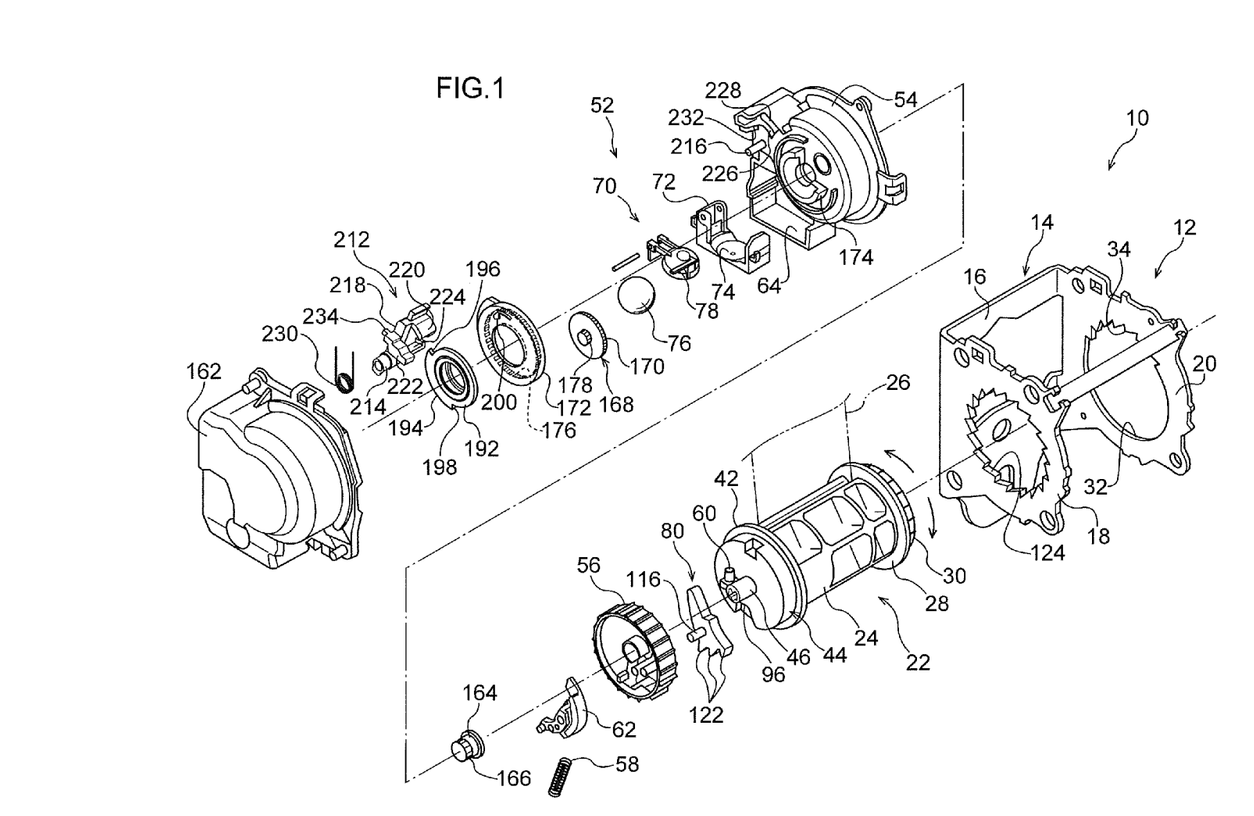
FIG. 1 is an exploded perspective view schematically showing the configuration of a webbing take-up device pertaining to the embodiment of the invention.

In FIG. 1, an outline of the overall configuration of a webbing take-up device 10 pertaining to an embodiment of the invention is shown by way of an exploded perspective view.

A device body 12 of the webbing take-up device 10 has a frame 14. The frame 14 has a plate-like back plate 16. A leg plate 18 extends from one width direction end of the back plate 16 toward one thickness direction side of the back plate 16, and a leg plate 20 extends from the other width direction end of the back plate 16 toward the one thickness direction side of the back plate 16 (i.e., the same direction in which the leg plate 18 extends from the back plate 16). For this reason, the frame 14 is formed in a substantially U-like cross sectional shape overall, and the back plate 16 of the frame 14 is directly or indirectly fixed, for example, to a skeletal (frame) member or reinforcement member configuring a vehicle body on the rear side of a rear seat in a vehicle.

Furthermore, the device body 12 has a spool 22. The spool 22 has a spool body 24 disposed between the leg plate 18 and the leg pate 20. The spool body 24 has a cylindrical shape whose central axis direction lies along the direction in which the leg plate 18 and the leg plate 20 face one another, and the outer peripheral portion of the spool body 24 is appropriately hollowed out for weight reduction. A lengthwise direction base end side of a long band-like webbing 26 is anchored to the spool body 24, and when the spool body 24 rotates one side about its central axis, the webbing 26 is taken up in layers onto the outer peripheral portion of the spool body 24.

A flange portion 28 whose outer diameter dimension is larger than the outer diameter dimension of the spool body 24 is formed, coaxially with the spool body 24, on the end portion at the leg plate 20 side of the spool body 24. An outer-toothed ratchet portion 30 is formed, coaxially with the spool body 24, on the side of the flange portion 28 opposite the spool body 24 side. The ratchet portion 30 is positioned on the inside of a hole portion 32 formed in the leg plate 20. Inner ratchet teeth 34 are formed on a section of the inner peripheral portion of the hole portion 32 on the side in the direction in which the webbing 26 is pulled out from the spool body 24. When, as a result of the webbing 26 being pulled, the spool body 24 is displaced toward the side in the direction in which the webbing 26 is pulled while the spool body 24 rotates in a pull-out direction opposite a take-up direction, the ratchet portion 30 meshes with the ratchet teeth 34 in the hole portion 32. Due to this, the rotation of the spool body 24 in the pull-out direction on the leg plate 20 side of the spool body 24 is regulated.

A shaft portion (not shown in the drawings) is formed, coaxially with the spool body 24, on the side of the ratchet portion 30 opposite the flange portion 28 side. The shaft portion enters the inside of a spring case (not shown in the drawings) disposed on the outside of the leg plate 20 (i.e., the side of the leg plate 20 opposite the leg plate 18 side), and the shaft portion is rotatably supported directly or indirectly in the spring case. A spiral spring is disposed on the inside of the spring case. The spiral spring is tightened as a result of the shaft portion, and further the spool 22, rotating in the pull-out direction, and urges, with its urging force, the spool 22 in the take-up direction. The webbing 26 is taken up onto the spool 22 as a result of the spool 22 rotating in the take-up direction due to this urging force.

Furthermore, a flange portion 42 whose outer diameter dimension is larger than the outer diameter dimension of the spool body 24 is formed, coaxially with the spool body 24, on the end portion at the leg plate 18 side of the spool body 24. A lock base 44 is formed on the side of the flange portion 42 opposite the spool body 24 side, and a shaft portion 46 is formed coaxially with the spool body 24 and projecting from the surface of the lock base 44 on the opposite side of the flange portion 42 side.

A sensor mechanism 52 is disposed on the leg plate 18 on the outside of the leg plate 18 (i.e., on the side of the leg plate 18 opposite the leg plate 20 side). The sensor mechanism 52 has a sensor holder 54 serving as a support body. The sensor holder 54 is attached to the leg plate 18 on the outside of the leg plate 18 (i.e., on the side of the leg plate 18 opposite the leg plate 20 side). The sensor holder 54 is formed in a substantially concave-like shape opening toward the leg plate 18 side. The aforementioned shaft portion 46 enters the sensor holder 54, whereby the shaft portion 46, and further the spool 22, is rotatably supported in the sensor holder 54.

A V gear 56 is disposed on the inside of the sensor holder 54. The V gear 56 is rotatably supported on the shaft portion 46. One end of a compression coil spring 58 is anchored to the V gear 56. The other end of the compression coil spring 58 is anchored to an anchor projection portion 60 formed on a surface of the aforementioned lock base 44 on the opposite side of the flange portion 42 side. For this reason, the V gear 56 is rotatably supported on the shaft portion 46 as described above, but when the spool 22 rotates in the pull-out direction, for example, the compression coil spring 58 compressed by this rotation urges the V gear 56 in the pull-out direction, and the V gear 56 rotates in the pull-out direction following the spool 22 due to this urging force.

A W pawl 62 that configures a WSIR mechanism is disposed on the side of the V gear 56 opposite the leg plate 18 side. The W pawl 62 is supported on the V gear 56 in a position away from the rotational center of the V gear 56 in the radial direction thereof in such a way that the W pawl 62 can swing about an axis whose axial direction has the same orientation as the central axis of the V gear 56. The W pawl 62 is urged in the pull-out direction by an urging member such as a torsion coil spring (not shown in the drawings). However, when, due to the V gear 56 rotating in the pull-out direction with a rotational acceleration equal to or greater than a predetermined magnitude, the W pawl 62, which is trying to remain in its position due to inertia, resultantly swings relatively in the take-up direction with respect to the V gear 56, the W pawl 62 meshes with ratchet teeth (not shown in the drawings) formed on the inside of the sensor holder 54. Due to this, the rotation of the V gear 56 in the pull-out direction is regulated (which is an actuated state of the WSIR mechanism).

Furthermore, a sensor housing portion 64 that opens toward the opposite side of the leg plate 18 side is formed on the side of the sensor holder 54 under the position where the V gear 56 is disposed, and an acceleration sensor 70 that configures a VSIR mechanism is disposed on the inside of the sensor housing portion 64. The acceleration sensor 70 has a sensor housing 72. The sensor housing 72 has a concave surface 74 that opens upward, and a spherical ball 76 is placed on the concave surface 74. On the upper side of the ball 76, a sensor lever 78 is supported on the sensor housing 72 in such a way as to be rotatable in an up and down direction. When the ball 76 moves due to inertia and rises on the concave surface 74 as a result of the vehicle rapidly decelerating, the ball 76 presses the sensor lever 78 from below and causes the lever 78 to rotate upward. The distal end side of the sensor lever 78 that has rotated in this way engages with a ratchet gear formed on the outer peripheral portion of the V gear 56 and regulates the rotation of the V gear 56 in the pull-out direction (which is an actuated state of the VSIR mechanism).

In this way, when the spool 22 rotates in the pull-out direction in a state in which the WSIR mechanism or the VSIR mechanism has been actuated (i.e., a state in which the rotation of the V gear 56 in the pull-out direction is regulated), the above mentioned compression coil spring 58 becomes compressed and relative rotation of the spool 22 in the pull-out direction with respect to the V gear 56 occurs. When this relative rotation of the spool 22 in the pull-out direction with respect to the V gear 56 occurs, a lock pawl 80 that configures a lock mechanism is actuated.

The lock pawl 80 is disposed on the above mentioned lock base 44. The lock base 44 is a thick-walled disc (or a cylinder whose dimension in its central axis direction is relatively short) whose outer diameter dimension is smaller than the outer diameter dimension of the flange portion 42. A pawl housing groove 96 is formed in the lock base 44. The pawl housing groove 96 is a through hole having one end and another end that open in different places in the circumferential direction in the outer peripheral portion of the lock base 44, and the lock pawl 80 is housed on the inside of the pawl housing groove 96.

A guide projection 116 that projects toward the V gear 56 side is formed on the lock pawl 80 and enters a long hole-like guide hole (not shown in the drawings) formed in the V gear 56. When the spool 22 rotates in the pull-out direction relatively with respect to the V gear 56, the guide projection 116 presses the inner peripheral portion of the guide hole. The guide projection 116 is guided in the lengthwise direction of the guide hole by the pressing reaction force that the guide projection 116 receives from the inner peripheral portion of the guide hole at this time. Moreover, the lock pawl 80 moves in such a way that the distal end side of the lock pawl 80 projects from the pawl housing groove 96 as a result of the side surface of the lock pawl 80 being guided on the inner wall of the pawl housing groove 96 at this time.

The lock base 44 on which the lock pawl 80 is disposed is positioned on the inside of an inner-toothed ratchet hole 124 formed in the leg plate 18. When the lock pawl 80 moves toward the outside of the pawl housing groove 96, ratchet teeth 122 formed on the distal end side of the lock pawl 80 mesh with the ratchet teeth formed on the inner peripheral portion of the ratchet hole 124. In this state, the lock pawl 80 cannot rotate in the pull-out direction about the central axis of the spool body 24. In this state, the inner wall of the pawl housing groove 96 is in contact with the side portion of the base end side of the lock pawl 80, and he lock pawl 80 receiving the load when the spool 22 tries to rotate in the pull-out direction. Due to this, the rotation of the spool 22 in the pull-out direction on the leg plate 18 side is regulated.

An ALR-ELR switch mechanism 160 is disposed on the side of the leg plate 18 opposite the leg plate 20 side.

As shown in FIG. 1, the ALR-ELR switch mechanism 160 has a cover 162. The cover 162 is formed in a substantially concave shape that opens toward the leg plate 18 side of the frame 14, and the cover 162 is fixed to the leg plate 18 in a state in which the sensor holder 54 is housed on the inside.

Figure 2:
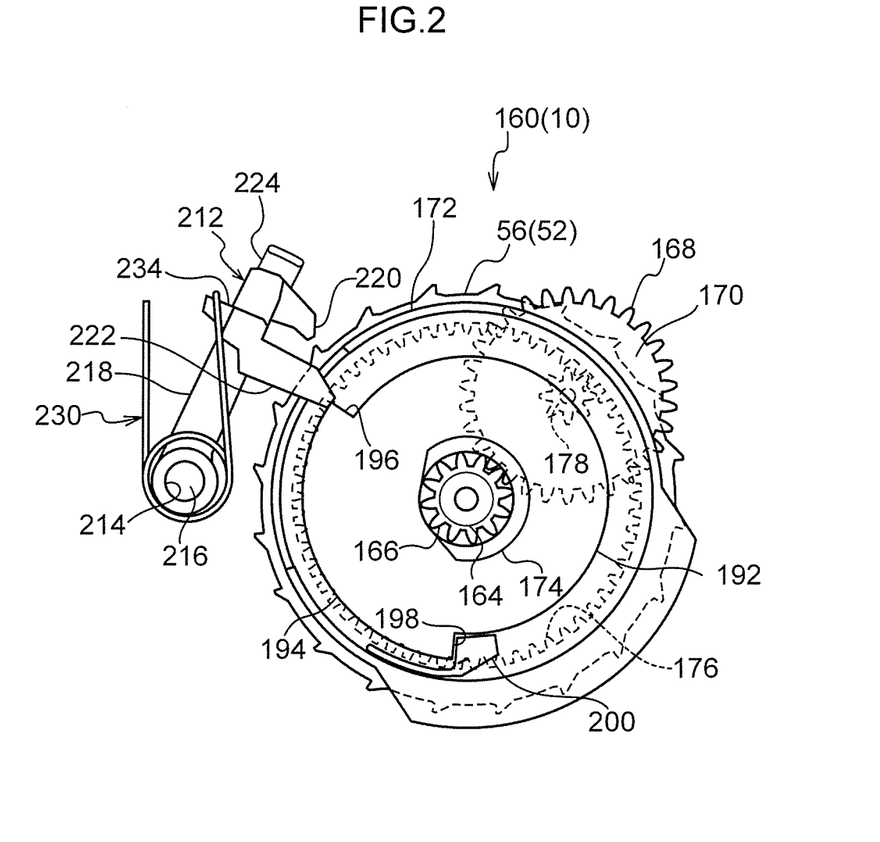
FIG. 2 is a side view showing the relationship between a switch member and other configurations of an ALR-ELR switch mechanism when a sensor mechanism is in actuatable state.

Furthermore, as shown in FIG. 2, the ALR-ELR switch mechanism 160 has a bush 164. The bush 164 is a shaft (axis) member whose central axis substantially coincides with the central axis of the spool 22, and the axial direction middle portion of the bush 164 is rotatably supported in a holder-side support hole formed in the sensor holder 54. One side (the leg plate 18 side) from the axial direction middle portion of the bush 164 is coaxially connected to the shaft portion 46 in a state in which relative rotation with respect to the shaft portion 46 of the spool 22 is regulated. For this reason, the bush 164 integrally rotates together with the spool 22.

A spur (flat) outer-toothed sun gear 166 is formed on the other side (on the opposite side of the leg plate 18 side) from the axial direction middle portion of the bush 164. A planetary gear 168 is rotatably supported in the sensor holder 54 on the side of the sun gear 166 in the radial direction of rotation of the sun gear 166. The planetary gear 168 has a spur (flat) outer-toothed large diameter gear portion 170, and the large diameter gear portion 170 meshes with the sun gear 166.

Furthermore, the ALR-ELR switch mechanism 160 has a carrier gear 172. The carrier gear 172 is rotatably supported, coaxially with the spool 22, on a support portion 174 formed on the sensor holder 54. Spur (flat) inner teeth 176 are formed on the carrier gear 172 coaxially with the rotational center of the carrier gear 172. A small diameter gear portion 178 integrally formed coaxially with the large diameter gear portion 170 on the planetary gear 168 meshes with the inner teeth 176.

That is, the sun gear 166, the planetary gear 168, and the carrier gear 172 configure a planetary gear mechanism. The planetary gear mechanism decelerates the rotations of the spool 22 required to go, in a state in which a seat belt device including the webbing take-up device 10 is attached to the vehicle, from a state in which the webbing 26 is taken up the most onto the spool 22 (hereinafter this state will be called a "completely stored state") to a state in which the webbing 26 is pulled out the most from the spool 22 (hereinafter this state will be called a "completely pulled-out state") in substantially one rotation so causes the carrier gear 172 to rotate in the opposite direction of the sun gear 166 (i.e., the spool 22).

On an axial direction side (the opposite side of the sensor holder 54 side) of the carrier gear 172, a control disc 192 is rotatably supported on the support portion 174 of the sensor holder 54. The control disc 192 is formed in an annular plate shape that is substantially coaxial with the spool 22. A holding flange 194 extends outward in the radial direction from part of the outer peripheral portion of the control disc 192. The outer peripheral portion of the holding flange 194 is curved, taking the rotational center of the control disc 192 as a center of curvature.

Furthermore, an end portion of the holding flange 194 on one side in the circumferential direction of the control disc 192 is to serve as a contact portion 196, and the end portion on the other side is to serve as a contact portion 198. A press portion 200 is formed on the rotational path of the holding flange 194 when the control disc 192 has rotated on the carrier gear 172. When the press portion 200 of the carrier gear 172 rotating in the take-up direction interlockingly with the sun gear 166 rotating in the pull-out direction comes into contact with the contact portion 196 and presses the contact portion 196 in the take-up direction, the control disc 192 rotates in the take-up direction. Furthermore, when the press portion 200 of the carrier gear 172 rotating in the pull-out direction interlockingly with the sun gear 166 rotating in the take-up direction comes into contact with the contact portion 198 and presses the contact portion 198 in the pull-out direction, the control disc 192 rotates in the pull-out direction.

Furthermore, the ALR-ELR switch mechanism 160 has a switch pawl 212 serving as a switch member. The switch pawl 212 has a base portion 214. The base portion 214 is formed in a tubular shape whose central axis direction has the same orientation as the central axis of the spool 22, and the base portion 214 is rotatably supported on a shaft 216 formed projecting from the surface of the sensor holder 54 on the opposite side of the leg plate 18 side. An arm piece 218 extends from the outer peripheral surface of the base portion 214.

Figure 4:
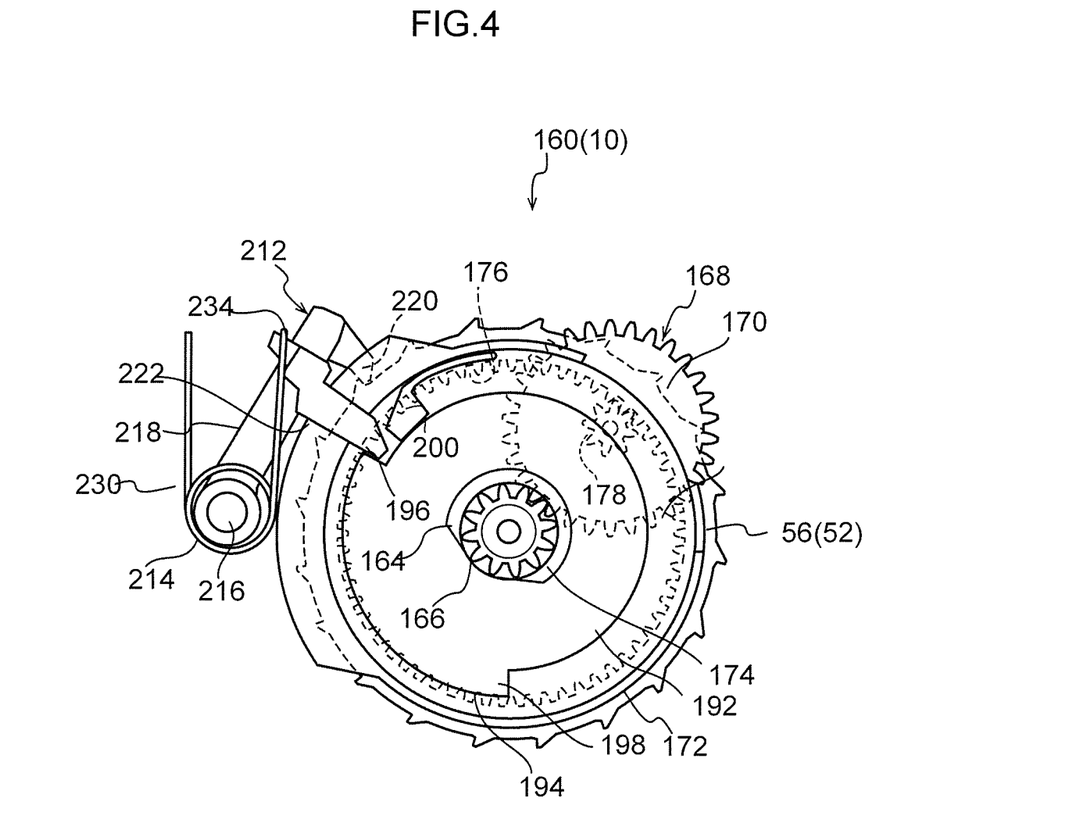
FIG. 4 is a side view showing the relationship between the switch member and other configurations of the ALR-ELR switch mechanism when the sensor mechanism is in the actuated state.

An engagement tooth 220 that extends toward the outer peripheral portion of the V gear 56 is disposed on the distal end side of the arm piece 218. As shown in FIG. 4, the distal end of the engagement tooth 220 moves toward and comes into contact with the outer peripheral portion of the V gear 56 as a result of the switch pawl 212 rotating one side about the shaft 216. In a state in which the distal end of the engagement tooth 220 is in contact with the outer peripheral portion of the V gear 56, the rotation of the V gear 56 in the pull-out direction is regulated by the engagement tooth 220 when the ratchet teeth formed on the outer peripheral portion of the V gear 56 come into contact with the engagement tooth 220 from the pull-out direction side. Consequently, when the spool 22 rotates in the pull-out direction in this state, the lock pawl 80 is actuated like in the case where the WSIR mechanism or the VSIR mechanism has been actuated.

Furthermore, as shown in FIG. 2, a contact piece 222 is disposed further on the base end side of the arm piece 218 than the engagement tooth 220. The contact piece 222 is disposed further on the axial direction distal end side (i.e., the opposite side of the sensor holder 54 side) of the shaft 216 than the engagement tooth 220. The distal end of the contact piece 222 is directed toward the outer peripheral portion of the control disc 192. The distal end of the contact piece 222 moves toward and comes into contact with the outer peripheral portion of the control disc 192 as a result of the switch pawl 212 rotating the one side about the shaft 216. Here, as shown in FIG. 2, the shape and the like of the contact piece 222 is set in such a way that, in a state in which the distal end of the contact piece 222 is in contact with the outer peripheral portion of the holding flange 194 or the press portion 200 of the carrier gear 172, the engagement tooth 220 is away from the outer peripheral portion of the V gear 56 (i.e., in such a way that the engagement tooth 220 is not in contact with the ratchet teeth formed on the outer peripheral portion of the V gear 56).

Figure 5:
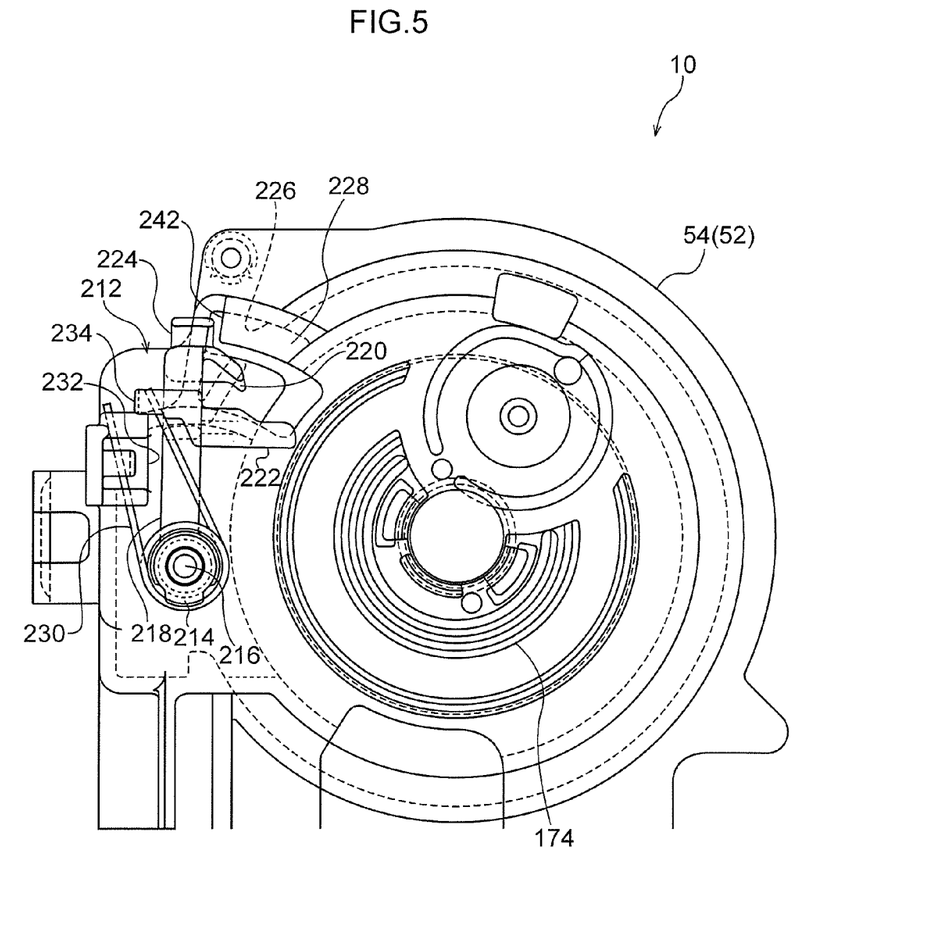
FIG. 5 is a side view showing a state prior to an engagement portion of the switch member being brought into facing to a regulation wall.

Moreover, as shown in FIG. 2 and FIG. 5, an engagement piece 224 serving as an engagement portion is formed on the distal end side of the arm piece 218. The engagement piece 224 extends toward the sensor holder 54 side from the distal end side of the arm piece 218. Moreover, the distal end side of the engagement piece 224 is bent in a substantial hook shape in a direction same as the direction toward the lengthwise direction distal end side of the arm piece 218. A window portion 226 is formed in the sensor holder 54 in correspondence to the distal end side of the engagement piece 224.

Figure 8:
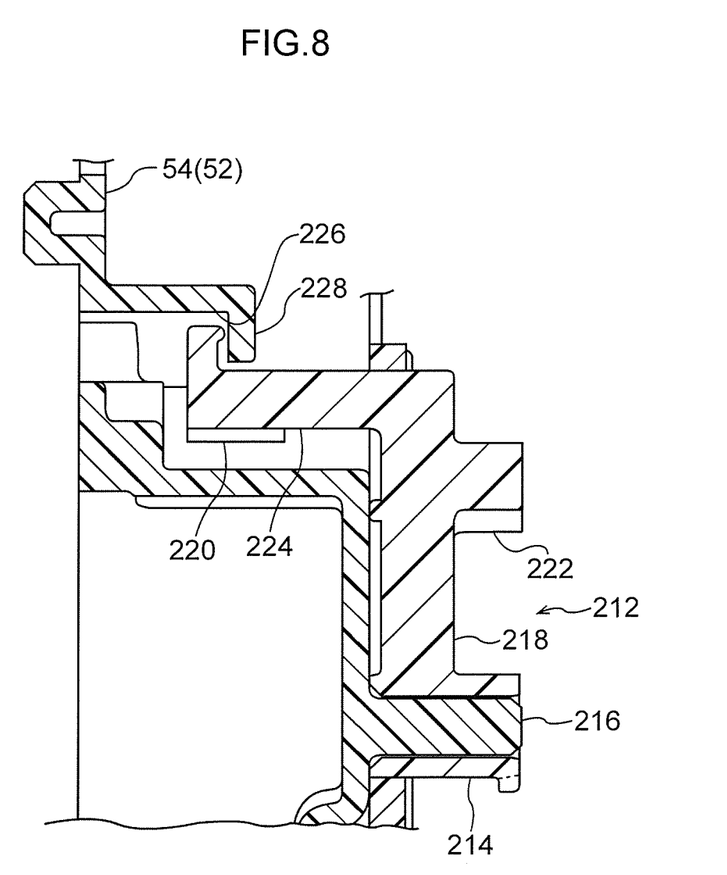
FIG. 8 is a side view showing a state in which the engagement portion and the regulation wall are facing to one another.

As shown in FIG. 8, the window portion 226 penetrates the sensor holder 54 in the direction of the rotational axis of the switch pawl 212, and the distal end side of the engagement piece 224 passes through the window portion 226. A regulation wall 228 is formed in the window portion 226. As shown in FIG. 8, the regulation wall 228 opposes (faces), in the direction of the rotational axis of the switch pawl 212, to the distal end portion of the engagement piece 224 bent in a hook shape, and if the switch pawl 212 tries to move toward the distal end side of the shaft 216, the regulation wall 228 comes into contact with the distal end portion of the engagement piece 224.

Here, the position where the engagement piece 224 is formed and the position where the regulation wall 228 is formed are set in such a way that at least part of the distal end of the engagement piece 224 which is bent in a hook shape opposes (faces to) the regulation wall 228 between the state in which the distal end of the contact piece 222 has come into contact with the outer peripheral portion of the holding flange 194 and the state in which the engagement tooth 220 has come into contact with the outer peripheral portion of the V gear 56.

Figure 6:
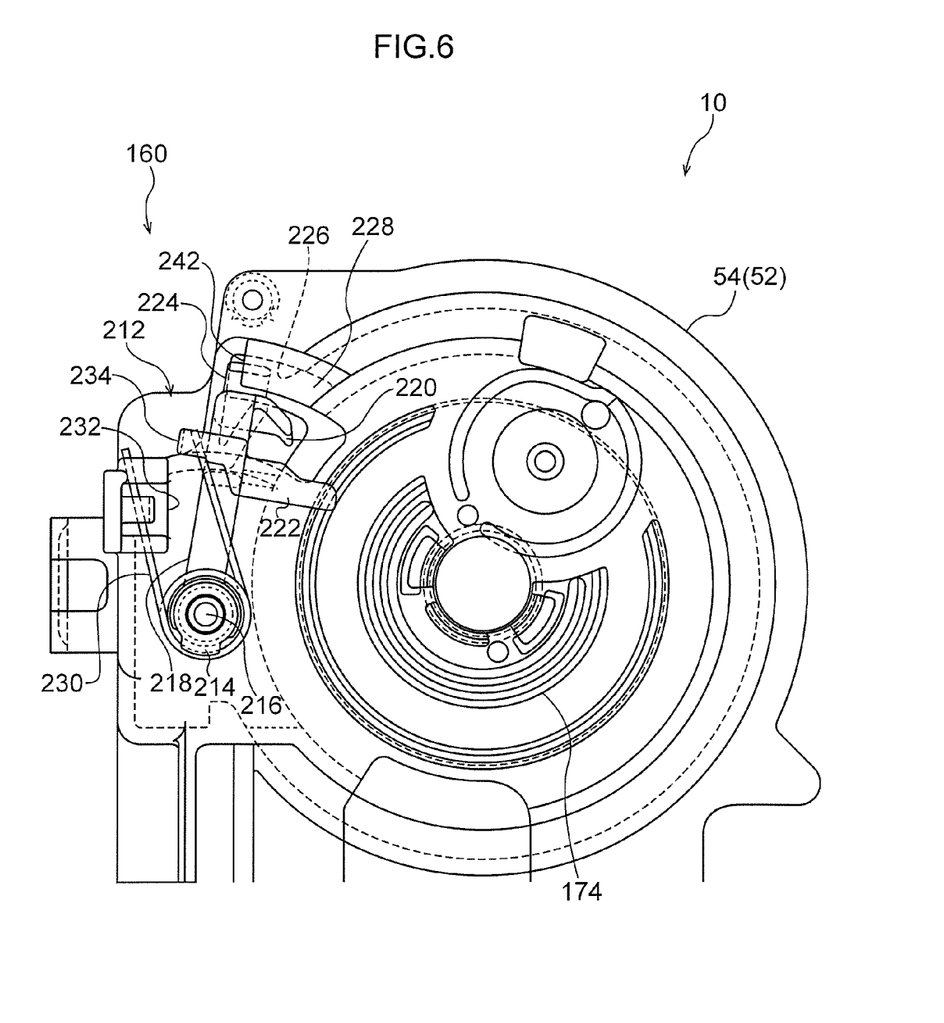
FIG. 6 is a side view corresponding to FIG. 5 with the switch member being in the state shown in FIG. 3.

Furthermore, as shown in FIG. 5, an open portion 242 is formed in the sensor holder 54 on the other side in the rotational direction of the switch pawl 212 in the window portion 226 (i.e., on the side in the direction in which the distal end of the engagement tooth 220 moves away from the outer peripheral portion of the V gear 56). The open portion 242 opens in the rotational direction of the switch pawl 212, and the engagement piece 224 can be moved to the inside of the window portion 226 from the open portion 242. Due to this, the regulation wall 228 and the distal end portion of the engagement piece 224 can be brought into opposition with one another as shown in FIG. 6.

Moreover, as shown in FIG. 5, a torsion coil spring 230 serving as an urging member is disposed on the aforementioned shaft 216. One end of the torsion coil spring 230 is anchored to an anchor piece 232 serving as a contact portion formed on the sensor holder 54, and the other end of the torsion coil spring 230 is anchored to an anchor piece 234 formed on the switch pawl 212. The switch pawl 212 is urged by the urging force of the torsion coil spring 230 in the direction in which the engagement tooth 220 moves approaching toward the outer peripheral portion of the V gear 56.

Furthermore, at least part of the anchor piece 232 opposes (faces to) the arm piece 218 on the side opposite the direction in which the switch pawl 212 is urged by the torsion coil spring 230, and the rotation of the switch pawl 212 in the opposite direction of the direction in which the switch pawl 212 is urged by the torsion coil spring 230 as a result of the anchor piece 232 coming into contact with the arm piece 218 is regulated.

<Operation and Effects of Present Embodiment>

Next, the operation and effects of the present embodiment will be described.

In the webbing take-up device 10, the VSIR mechanism is actuated on the basis of the acceleration of the vehicle at a time when there is a sudden deceleration of the vehicle, and when the rotational acceleration of the spool 22 in the pull-out direction becomes equal to or greater than a predetermined magnitude, the WSIR mechanism is actuated.

When it becomes a state in which the vehicle suddenly decelerates, the ball 76 of the acceleration sensor 70 rolls on the concave surface 74 of the sensor housing 72. When, Due to this, the ball 76 rises on the sloping surface of the concave surface 74, the ball 76 pushes the sensor lever 78 upward. The sensor lever 78 pushed by the ball 76 rotates upward and the distal end of the sensor lever 78 meshes with the ratchet teeth formed on the outer peripheral portion of the V gear 56. Due to this, the rotation of the V gear 56 in the pull-out direction is regulated.

Meanwhile, for example, when the vehicle decelerates, the body of the occupant seated in the seat of the vehicle tries to move toward the vehicle front side due to inertia, whereby the webbing 26 is pulled and the spool 22 rotates in the pull-out direction. If the rotational acceleration, in the pull-out direction, of the V gear 56 rotating following the spool 22 rotating in the pull-out direction at this time is a predetermined magnitude, the W pawl 62 disposed on the V gear 56 swings relatively with respect to the V gear 56, whereby the distal end of the W pawl 62 meshes with the ratchet teeth disposed on the inside of the sensor holder 54. Due to this, the rotation of the V gear 56 in the pull-out direction is regulated.

Ordinarily, when the spool 22 rotates in the pull-out direction, the V gear 56 is, caused by the compression coil spring 58, rotated in such a way as to follow the spool 22, but when the spool 22 rotates in the pull-out direction in the state in which the rotation of the V gear 56 in the pull-out direction is regulated as described above, the spool 22 relatively rotates in the pull-out direction with respect to the V gear 56 while compressing and deforming the compression coil spring 58.

When this relative rotation of the spool 22 in the pull-out direction with respect to the V gear 56 occurs, the guide projection 116 of the lock pawl 80 which is in the guide hole in the V gear 56 presses the inner peripheral portion of the guide hole in the V gear 56. The guide projection 116 is guided in the lengthwise direction of the guide hole in the V gear 56 by the pressing reaction force that the guide projection 116 receives from the inner peripheral portion of the guide hole in the V gear 56 at this time. Moreover, the lock pawl 80 is guided on the inner wall of the pawl housing groove 96 at this time, whereby the lock pawl 80 moves in such a way that the lock pawl 80 projects outward in the radiation direction of rotation of the spool 22 from the pawl housing groove 96.

The ratchet teeth 122 formed on the distal end side of the lock pawl 80, that has moved in this way, mesh with the ratchet teeth in the ratchet hole 124 formed in the leg plate 18 of the frame 14. Due to this, the rotation of the lock pawl 80 in the pull-out direction about the central axis of the spool body 24 is regulated. Moreover, in this state, the base end side of the lock pawl 80 is in contact with the inner wall of the pawl housing groove 96, and the lock pawl 80 receives the load when the spool 22 tries to rotate in the pull-out direction. Due to this, the rotation of the spool 22 in the pull-out direction is regulated and the pulling-out of the webbing 26 from the spool 22 is regulated. Due to that the pulling-out of the webbing 26 from the spool 22 is regulated in this way, the body of the occupant can be effectively restrained by the webbing 26 at a time when there is a sudden deceleration of the vehicle.

When the webbing 26 is pulled out and the spool 22 rotates in the pull-out direction, this rotation is transmitted from the sun gear 164 via the planetary gear 168 to the carrier gear 172 so as to decelerate, and causes the carrier gear 172 to rotate in the take-up direction. In just before the state in which the webbing 26 reaches the completely pulled-out state in which all of the webbing 26 is pulled out from the spool body 24, the press portion 200 of the carrier gear 172 comes into contact with the contact portion 196 of the control disc 192.

Figure 3:
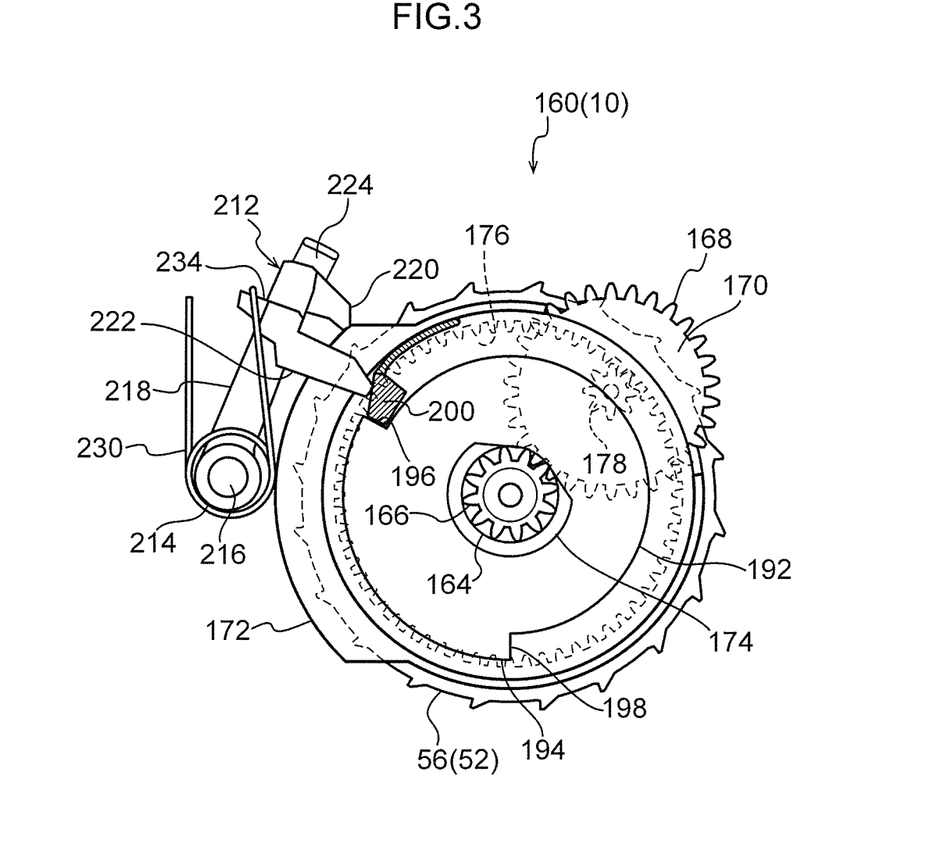
FIG. 3 is a side view showing the relationship between the switch member and other configurations of the ALR-ELR switch mechanism while the sensor mechanism is switching from the actuatable state to an actuated state.

When the carrier gear 172 further rotates in the take-up direction in this state, the contact portion 196 is pressed by the press portion 200 so that the control disc 192 rotates in the take-up direction. So, the contact piece 222 of the switch pawl 212 whose distal end had been in contact with the outer peripheral surface of the holding flange 194 of the control disc 192 up until then as shown in FIG. 2, comes off of the holding flange 194 on the contact portion 196 side of the holding flange 194 as shown in FIG. 3. When the contact piece 222 comes off of the holding flange 194, the switch pawl 212 rotates due to the urging force of the torsion coil spring 230 and presses the distal end of the contact piece 222 into contact with the press portion 200.

When the spool 22 is rotated a predetermined angle in the take-up direction from this state, the press portion 200 rotates in the pull-out direction together with the carrier gear 172. Due to this, as shown in FIG. 4, the contact portion 222 of the switch pawl 212 comes off of the press portion 200, and rotates in such a way as to enter between the contact portion 196 and the press portion 200 due to the urging force of the torsion coil spring 230.

When the switch pawl 212 rotates in this way, the engagement tooth 220 comes into contact with the outer peripheral portion of the V gear 56, and the engagement tooth 220 meshes with the ratchet teeth formed on the outer peripheral portion of the V gear 56 (i.e., the sensor mechanism 52 switches to an actuated state). Due to this, the rotation of the V gear 56 in the pull-out direction is regulated. When the webbing 26 is pulled in this state and the spool 22 rotates in the pull-out direction, the spool 22 rotates in the pull-out direction relatively with respect to the V gear 56, whereby, like at the time of VSIR actuation described above, the ratchet teeth 122 formed on the distal end side of the lock pawl 80 mesh with the ratchet teeth in the ratchet hole 124 and the rotation of the spool 22 in the pull-out direction is regulated.

That is, in this state, the spool 22 can be rotated in the take-up direction to cause the webbing 26 to be taken up onto the spool body 24, but the webbing 26 cannot be pulled out from the spool body 24 because the spool 22 cannot be rotated in the pull-out direction.

When the spool 22 is rotated a certain angle in the take-up direction in this state, the press portion 200 presses the contact portion 198 and causes the control disc 192 to rotate in the pull-out direction. When the control disc 192 rotates in the pull-out direction in this way, as shown in FIG. 2, the switch pawl 212 rotates in such a way that the contact piece 222 rides up onto the outer peripheral portion of the holding flange 194. When the engagement tooth 220 moves away from the outer peripheral portion of the V gear 56 due to this rotation of the switch pawl 212, the regulation of the rotation of the V gear 56 in the pull-out direction by the engagement tooth 220 is released and the spool 22 can be rotated in the pull-out direction (i.e., the sensor mechanism 52 switches to an actuatable state).

Here, in the present embodiment, the base portion 214 of the switch pawl 212 is rotatably supported on the shaft 216. If the switch pawl 212 tries to move toward the distal end side of the shaft 216, the regulation wall 228 formed in the window portion 226 comes into contact with the distal end of the engagement piece 224, which is bent in a hook shape. Due to this, the movement of the switch pawl 212 toward the distal end side of the shaft 216 is regulated.

When attaching the switch pawl 212 to the sensor holder 54, first, the shaft 216 is inserted into the base portion 214 as described above so that the base portion 214 is supported on the shaft 216. In this state, as shown in FIG. 5, in a state in which the engagement piece 224 has been positioned on the outside of the open portion 242 in the sensor holder 54, the switch pawl 212 is rotated about the shaft 216 to cause the engagement piece 224 to enter into (penetrate) the window portion 226.

Due to this, as shown in FIG. 6, the distal end of the engagement piece 224, which is bent in a hook shape, opposes (faces to) the regulation wall 228 in the axial direction of the shaft 216. In this way, in the present embodiment, it is not necessary to elastically deform the engagement piece 224 like an elastic claw piece when bringing the regulation wall 228 and the engagement piece 224 into opposition with one another on the opposite side of the shaft 216 side. For this reason, the face-area in which the engagement piece 224 opposes (faces to) the regulation wall 228 (i.e., the engagement allowance) can be enlarged, so the distal end of the engagement piece 224 can be prevented from going and riding over (crossing over) the regulation wall 228 and moving toward the shaft 216 side.

Figure 7:
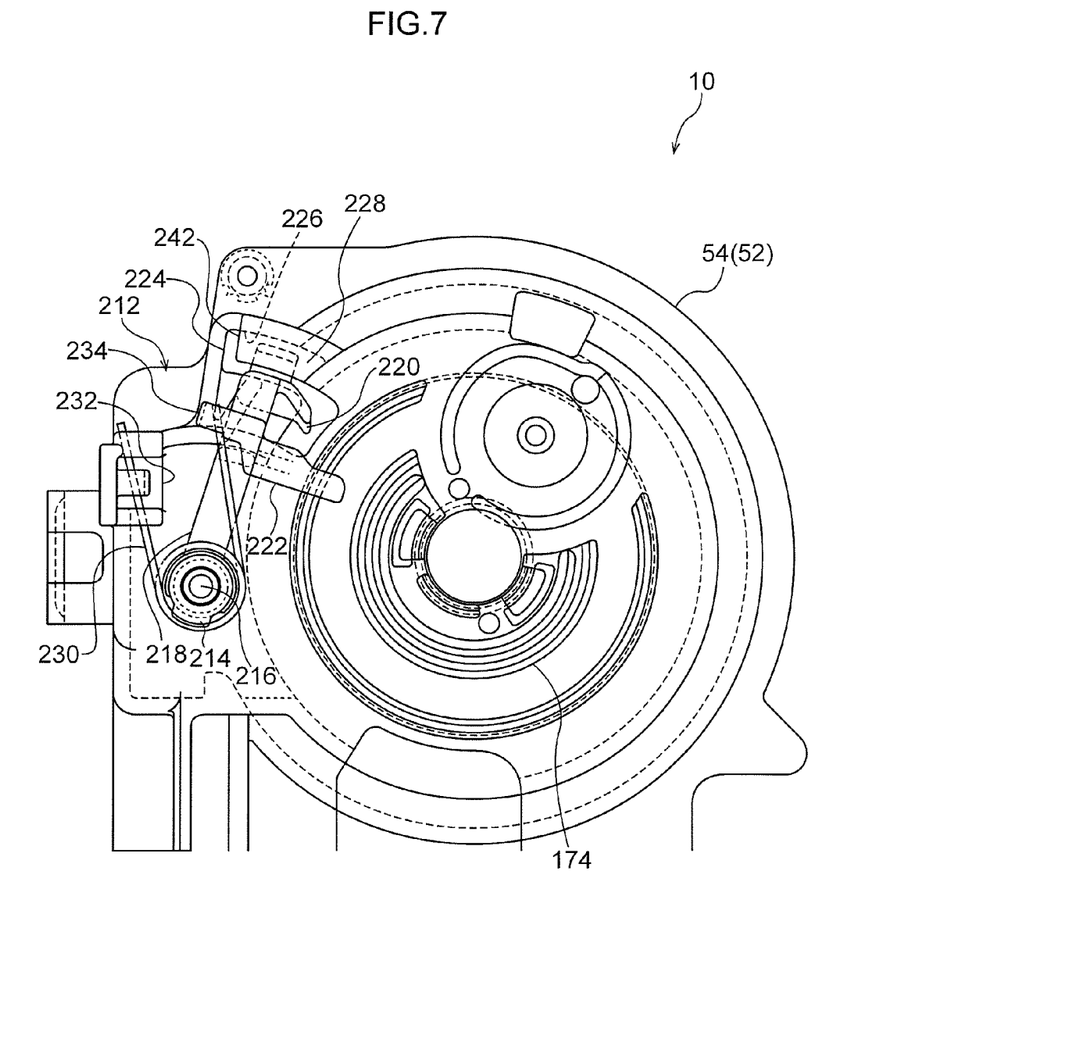
FIG. 7 is a side view corresponding to FIG. 5 with the switch member being in the state shown in FIG. 4.

Furthermore, as shown in FIG. 6, which shows the same rotational position as that of the switch pawl 212 in FIG. 3, the regulation wall 228 opposes (faces to) the distal end of the engagement piece 224 even in a state in which the contact piece 222 has ridden up on the outer peripheral portion of the holding flange 194. Moreover, as shown in FIG. 7, which shows the same rotational position as that of the switch pawl 212 in FIG. 4, the regulation wall 228 opposes (faces to) the distal end of the engagement piece 224 even in a state in which the engagement tooth 220 is in contact with the outer peripheral portion of the sensor holder 54. For this reason, in the operating range of the switch pawl 212, the engagement piece 224 does not escape to (go out to) the outside of the opening on the side of the window portion 226 in the sensor holder 54. Moreover, the switch pawl 212 is urged by the torsion coil spring 230, so the switch pawl 212 does not rotate toward the other side in the direction about its rotational axis from the state shown in FIG. 6, and due to this also, the engagement piece 224 can be prevented from escaping to the outside of the opening on the side of the window portion 226 in the sensor holder 54.

Moreover, even if the switch pawl 212 rotates counter to the urging force of the torsion coil spring 230, the anchor piece 232 comes into contact with the arm piece 218 when the switch pawl 212 rotates a certain angle. Due to this, the switch pawl 212 does not rotate further from this in the opposite direction of the direction in which it is urged by the torsion coil spring 230, and due to this also, the engagement piece 224 can be prevented from escaping to the outside of the opening on the side of the window portion 226.

What is claimed is:

1. A webbing take-up device comprising:
    a spool that takes up a webbing by rotating in a take-up direction;
    a lock mechanism that regulates rotation of the spool in a pull-out direction, which is opposite to the take-up direction, by switching from an actuatable state to an actuated state;
    a switch member having one end that is rotatably supported on one side of a support body, the switch member rotating in a direction about a rotational axis on its one end such that an opposite end of the switch member moves toward an opposite side of the support body as a result of a certain amount or more of the webbing being pulled out from the spool so as to switch the lock mechanism from the actuatable state to the actuated state, the switch member rotating in an opposite direction about the rotational axis away from the opposite side of the support body as a result of a certain amount or more of the webbing being taken up onto the spool so as to switch the lock mechanism from the actuated state to the actuatable state;
    a window portion that is formed in the support body and at which a regulation wall is formed, the regulation wall having an inner surface that is orthogonal to the rotational axis of the switch member;
    an opening that is formed in the support body, a portion of the window portion which is at the one side of the support body communicating with the opening; and
    an engagement portion that is formed at the switch member at the opposite end, the engagement portion being entered inside the window portion by rotating with respect to the window portion from the opening toward the opposite side of the support body in the direction about the rotational axis of the switch member so that a distal end side of the engagement portion, which is entered inside the window portion, faces and is captured by the inner surface of the regulation wall in the axis direction of the rotational axis of the switch member in a state in which the distal end side of the engagement portion is located at a third side of the support body in the axis direction of the rotational axis of the switch member and the regulation wall is located at the a fourth side of the support body that is opposite to the third side such that the distal end side of the engagement portion comes into contact with the regulation wall when the switch member is displaced in a direction away from the support body in the axis direction of the rotational axis of the switch member.

2. The webbing take-up device of claim 1, further comprising an urging member that urges the switch member toward the one side in the direction about the rotational axis, wherein the distal end side of the engagement portion is set such that the distal end side of the engagement portion faces to the regulation wall in the direction of the rotational axis, in both the actuatable state and the actuated state of the lock mechanism.

3. The webbing take-up device of claim 2, further comprising a contact portion that is provided at the support body so as to be able to contact the switch member on the another side in the direction about the rotational axis, and that regulates rotation of the switch member toward the another side in the direction about the rotational axis by the switch member coming into contact with the contact portion.

4. The webbing take-up device of claim 1, further comprising a contact portion that is provided at the support body so as to be able to contact the switch member on the another side in the direction about the rotational axis, and that regulates rotation of the switch member toward the another side in the direction about the rotational axis by the switch member coming into contact with the contact portion.

5. The webbing take-up device of claim 1, wherein:
    the spool is provided between a pair of leg portions of a frame, and
    the support body is mounted at one of the leg portions.

* * * * *